W. KIBLER.
PROCESS OF MAKING LIME-SULFUR SOLUTION.
APPLICATION FILED FEB. 29, 1912.
1,038,387.  Patented Sept. 10, 1912.
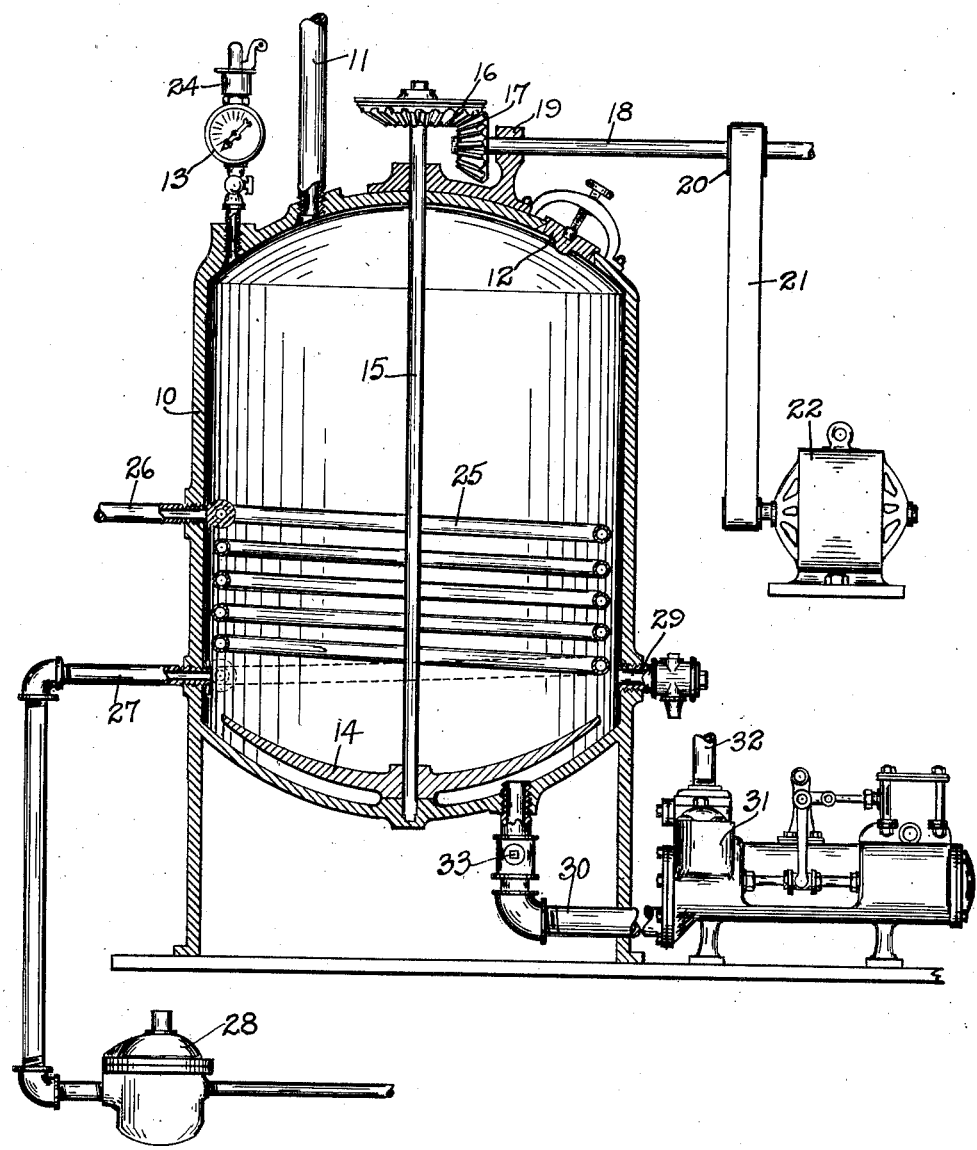
WITNESSES:
O. W. McLaughlin
R. N. Swadener
INVENTOR.
Walter Kibler
BY
V. H. Lockwood
ATTORNEY.

UNITED STATES PATENT OFFICE.

WALTER KIBLER, OF INDIANAPOLIS, INDIANA.

PROCESS OF MAKING LIME-SULFUR SOLUTION.

1,038,387. Specification of Letters Patent. Patented Sept. 10, 1912.

Application filed February 29, 1912. Serial No. 680,615.

*To all whom it may concern:*

Be it known that I, WALTER KIBLER, a citizen of the United States, and a resident of Indianapolis, county of Marion, and State of Indiana, have invented a certain useful Process of Making Lime-Sulfur Solution; and I do hereby declare that the following is a full, clear, and exact description thereof, reference being had to the accompanying drawings.

The object of this invention is to provide an improved process or method of manufacturing lime sulfur solution, the principal use of which at the present time is for spraying trees to destroy fungus diseases thereof. It is understood that calcium sulfid is the active agent in destroying said tree diseases, and, therefore, lime sulfur solution is effective for said purpose in proportion to the amount of calcium sulfid in the solution.

Therefore, an object of this invention is to make a lime sulfur solution which contains the sulfur in the sulfid form and which does not contain any of the sulfate. The sulfate is not desired.

In the lime sulfur solution heretofore made by the ordinary process in use, there has been present a considerable amount of the sulfate. This has resulted chiefly because the solution while being manufactured, was exposed to the atmosphere and when the same is boiled in contact with the atmosphere, some of the sulfid is necessarily converted into sulfate by the action of the oxygen in the air.

The chief feature of this invention consists in boiling lime sulfur solution out of contact with the atmosphere so that the sulfid cannot be changed into sulfate; also boiling the same under pressure, thereby increasing the temperature or otherwise boiling the same under high temperature and away from the atmosphere.

A means for carrying out said process is illustrated in the drawing which is a central vertical section through a vessel used for boiling the solution and the other parts being associated therewith being shown in elevation and some broken away.

In said drawing 10 is an air tight vessel into which the lime, sulfur and water are introduced through a pipe 11 entering at the top.

12 is a man hole at the top.

13 is a pressure gage in the pipe leading from the top and which is also connected to a puppet valve 24. In the bottom of the container or the vessel 10 there is an agitator 14 actuated by a shaft 15 having bearings in the bottom and top and extending above the top and having thereon a beveled wheel 16 which meshes with a beveled wheel 17 on the shaft 18 having a bearing 19 extending up from the top of the vessel. It is driven by a pulley 20 and belt 21 from a motor 22.

The contents of the vessel 10 are heated by a coil of pipes 25 therein, to which steam is supplied through a pipe 26 and from which it is exhausted by a pipe 27 leading to a trap 28. A pet cock 29 is located in the lower part of the vessel at the side.

The apparatus just described is used in the following manner: The lime, powdered sulfur and water are introduced through the feed pipe 11 and while being introduced the puppet valve 24 is opened so that air escapes through the top. The vessel is filled with the solution until it almost reaches the top, leaving but little air therein. The steam is turned on and the material starts to boil and the water therein is converted into steam which passes through the top. The puppet valve is left open after the formation of steam has commenced until all of the air has issued from the vessel and until after the steam has started to issue therefrom and then the puppet valve is closed, leaving the vessel practically free from air. As the heat of the contents increases the steam pressure likewise increases and this is continued until the pressure has reached, say seventy-five pounds, as indicated by the gage 13. This shows that the temperature in the vessel is considerably above water boiling point, in fact, is sufficiently high to readily melt the sulfur. This high temperature facilitates the melting of the sulfur even when it is not well powdered. The agitator 14 keeps the material stirred. After the same has been sufficiently treated in this manner so as to properly form the solution as explained and without oxygen from contact with the air, it is drawn off from the bottom through a pipe 30 and pump 31 and then through a pipe 32 to a suitable receptacle. The pipe 30 has in it a valve 33 which is closed during the boiling of the solution.

The invention is not limited to any particular means or mechanism for treating the material, as old devices can be used for the purpose.

I claim as my invention:

1. In the process of making lime sulfur solution, boiling the lime, sulfur and water with the air excluded therefrom.

2. The process of making lime sulfur solution, the process including mixing lime, sulfur and water together, boiling the same out of contact with the atmosphere, and agitating the same while being boiled.

3. The process of making lime sulfur solution, boiling lime, sulfur and water under pressure.

4. In the process of making lime sulfur solution, boiling lime, powdered sulfur and water out of contact with the atmosphere and under pressure which raises the boiling point thereof appreciably above that of water.

In witness whereof, I have hereunto affixed my signature in the presence of the witnesses herein named.

WALTER KIBLER.

Witnesses:
 G. H. BOINK,
 O. M. McLAUGHLIN.